US010477654B2

(12) United States Patent
Sugar et al.

(10) Patent No.: US 10,477,654 B2
(45) Date of Patent: Nov. 12, 2019

(54) DECORATIVE DEVICE WITH WIRELESS CONTROLLER, DECORATIVE SYSTEM, AND METHOD

(71) Applicant: INLITEN, L.L.C., Glenview, IL (US)

(72) Inventors: Michael A. Sugar, Evanston, IL (US); Matthew P. Braasch, Northfield, IL (US); Michael Garrett, Wilmette, IL (US); Greg Feeney, Chicago, IL (US); Jackson Wilson, Evanston, IL (US)

(73) Assignee: INLITEN, L.L.C., Glenview, IL (US)

( * ) Notice: Subject to any disclaimer, the term of this patent is extended or adjusted under 35 U.S.C. 154(b) by 0 days.

(21) Appl. No.: 15/915,268

(22) Filed: Mar. 8, 2018

(65) Prior Publication Data

US 2018/0270934 A1    Sep. 20, 2018

Related U.S. Application Data

(60) Provisional application No. 62/471,194, filed on Mar. 14, 2017.

(51) Int. Cl.
*H05B 37/02* (2006.01)
*H05B 33/08* (2006.01)
*H04W 4/80* (2018.01)
*H04W 76/10* (2018.01)
*H04W 4/06* (2009.01)
*H04W 84/18* (2009.01)

(52) U.S. Cl.
CPC .......... *H05B 37/0272* (2013.01); *H04W 4/06* (2013.01); *H04W 4/80* (2018.02); *H04W 76/10* (2018.02); *H04W 84/18* (2013.01); *H05B 33/0863* (2013.01); *H05B 37/0281* (2013.01); *Y02B 20/42* (2013.01)

(58) Field of Classification Search
CPC ............ H05B 37/0272; H05B 37/0281; H05B 33/0863; H04W 4/80; H04W 76/10
See application file for complete search history.

(56) References Cited

U.S. PATENT DOCUMENTS 9,832,833 B1 * 11/2017 Pipe-Mazo ........ H05B 33/0854
10,117,298 B1 * 10/2018 Loomis ............. H05B 37/0254
2007/0217209 A1 * 9/2007 Wong ................ H05B 33/0842
                                                              362/418

(Continued)

FOREIGN PATENT DOCUMENTS

WO    2015049412    4/2015

*Primary Examiner* — Dedei K Hammond
*Assistant Examiner* — Raymond R Chai
(74) *Attorney, Agent, or Firm* — Michael Best & Friedrich LLP

(57) ABSTRACT

A decorative device includes a wireless controller and a decoration. The wireless controller includes a memory, an interface, a mesh transceiver, and an electronic processor. The electronic processor is configured to receive an indication of a pairing input from the interface and control the mesh transceiver to form a mesh network with one or more mesh transceivers of a plurality of mesh transceivers. The electronic processor is also configured to receive an indication of a decorative control input from the interface and broadcast the decorative control input and a timing signal over the mesh network to synchronize one or more decorations of one or more decorative devices with the decoration.

25 Claims, 14 Drawing Sheets

(56) References Cited

U.S. PATENT DOCUMENTS

| | | | |
|---|---|---|---|
| 2008/0157688 A1* | 7/2008 | Gibboney | F21V 23/00 |
| | | | 315/185 S |
| 2008/0303445 A1* | 12/2008 | Neuman | A47G 33/06 |
| | | | 315/76 |
| 2010/0171430 A1* | 7/2010 | Seydoux | H05B 37/0227 |
| | | | 315/159 |
| 2011/0285299 A1* | 11/2011 | Kinderman | H05B 37/0272 |
| | | | 315/192 |
| 2015/0084515 A1* | 3/2015 | Altamura | H05B 37/0281 |
| | | | 315/131 |
| 2017/0142813 A1* | 5/2017 | Sahni | A01G 22/00 |
| 2017/0230364 A1* | 8/2017 | Barile | G06T 7/20 |
| 2017/0303646 A1* | 10/2017 | Bricken | G06F 1/1652 |
| 2017/0359885 A1* | 12/2017 | Roosli | H05B 37/0272 |
| 2018/0077766 A1* | 3/2018 | Sooch | H05B 33/0857 |
| 2018/0168018 A1* | 6/2018 | Goergen | H05B 37/0272 |
| 2018/0192500 A1* | 7/2018 | Frederick | H05B 37/0272 |
| 2018/0324931 A1* | 11/2018 | Zhang | F21K 9/238 |
| 2018/0352636 A1* | 12/2018 | Engelen | H05B 33/0863 |
| 2019/0014635 A1* | 1/2019 | Jones | H04W 4/021 |

* cited by examiner

DECORATIVE DEVICE WITH WIRELESS CONTROLLER, DECORATIVE SYSTEM, AND METHOD

FIELD

The present subject matter relates to a decorative device with a wireless controller. More particularly, the present subject matter relates to an outdoor decorative lighting device with a wireless controller, an outdoor decorative lighting system, and a method for operating an outdoor decorative lighting system.

BACKGROUND

A decorative device is used for decoration and to celebrate various occasions. The decorative device provides a decorative effect that symbolizes an aspect of a particular occasion or provides a desired ambiance.

SUMMARY

Disclosed herein is a decorative device with a wireless controller, a decorative system, and a method for operating the decorative system. One embodiment provides a decorative device. The decorative device includes a wireless controller and a decoration having a plurality of decorative functions. The wireless controller includes a memory, an interface configured to receive a pairing input and a decorative control input, a mesh transceiver configured to form a mesh network with a plurality of mesh transceivers, and an electronic processor connected to the memory, the interface, and the mesh transceiver. The electronic processor is configured to receive an indication of the pairing input from the interface, and in response to receiving the indication of the pairing input, control the mesh transceiver to form the mesh network with one or more mesh transceivers of the plurality of mesh transceivers. The electronic processor is also configured to receive an indication of the decorative control input from the interface, and in response to receiving the indication of the decorative control input, broadcast the decorative control input and a timing signal over the mesh network to synchronize one or more decorations of one or more decorative devices with the decoration, each of the one or more decorative devices including at least one of the one or more mesh transceivers.

Another embodiment provides a decorative system. The decorative system includes a first decorative device and a second decorative device. The first decorative device includes a first decoration having a first plurality of decorative functions and a first wireless controller having a first mesh transceiver. The second decorative device includes a second decoration having a second plurality of decorative functions and a second wireless controller. The second wireless controller includes a memory, an interface configured to receive a pairing input and a decorative control input, a second mesh transceiver configured to form a mesh network with at least the first mesh transceiver, and an electronic processor connected to the memory, the interface, and the second mesh transceiver. The electronic processor is configured to receive an indication of the pairing input from the interface, and in response to receiving the indication of the pairing input, control the second mesh transceiver to form the mesh network with at least the first mesh transceiver. The electronic processor is also configured to receive an indication of the decorative control input from the interface, and in response to receiving the indication of the decorative control input, broadcast the decorative control input and a timing signal over the mesh network to synchronize at least the first decoration of the first decorative device with the second decoration.

Another embodiment provides a method for operating a decorative system. The method includes pairing a wireless controller of a first decorative device with a second decorative device to form a mesh network. The method includes receiving, with an interface, a decorative control input. The method includes broadcasting, with the wireless controller, the decorative control input and a timing signal over the mesh network to synchronize a decoration of the second device with a decoration of the first decorative device in response to receiving the indication of the decorative control input. The decoration of the first decorative device has a first plurality of decorative functions and the decoration of the second decorative device has a second plurality of decorative functions.

Other aspects of the present disclosure will become apparent by consideration of the detailed description and accompanying drawings.

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of supporting other embodiments and of being practiced or of being carried out in various ways.

Figure 1:
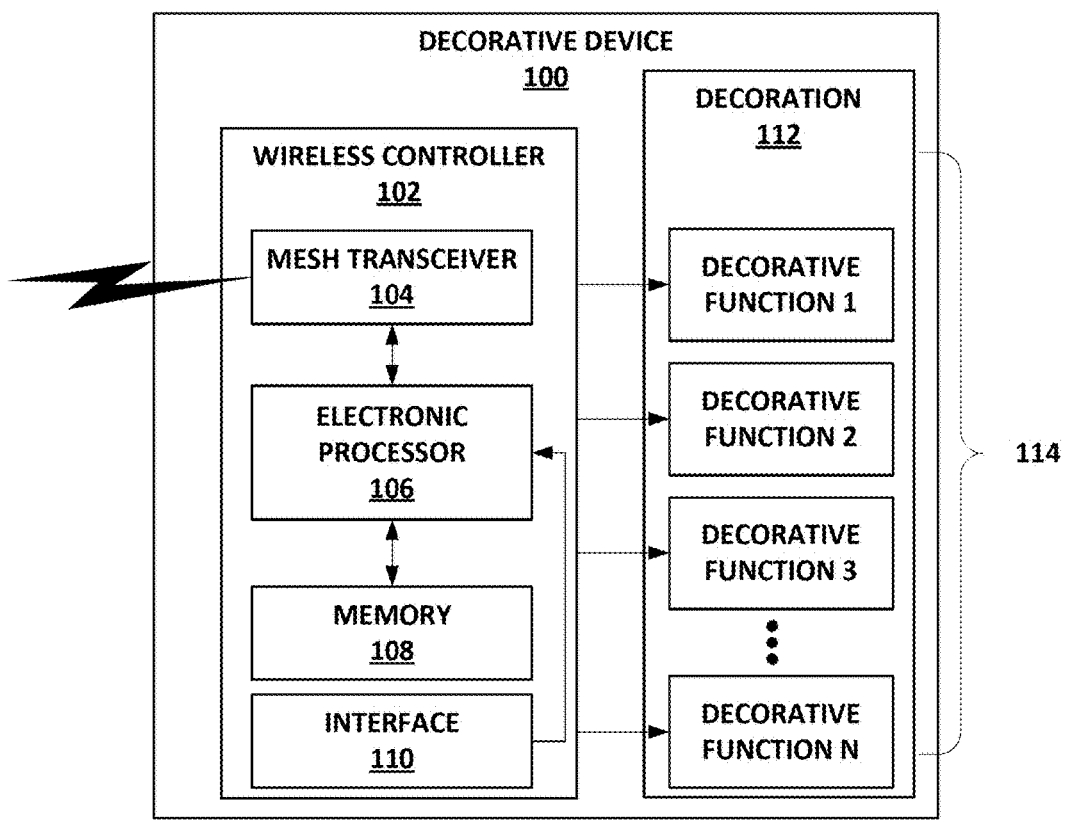
FIG. 1 is a block diagram of a decorative device with a wireless controller in accordance with some embodiments of the present disclosure.

FIG. 1 is a block diagram of a decorative device 100 with a wireless controller 102 in accordance with some embodiments of the present disclosure. The term "decorative device" refers to a light string or light strings, decorations, trees, wreaths, garlands, or other suitable decorative devices (for example, FIGS. 3A through 3C described below).

In the example of FIG. 1, the decorative device 100 includes a wireless controller 102. The wireless controller 102 includes a mesh transceiver 104, an electronic processor 106, a memory 108, and an interface 110. The decorative device 100 also includes a decoration 112 and a power source (not shown) (e.g., a battery or power from an outlet).

The decoration 112 is configured to provide a plurality of controllably decorative functions 114. For example, if the decoration 112 is a string of individual lights, the various controllable decorative functions 114 may determine which lights are illuminated, whether illuminated lights are kept on solid or are "blinking," and, if blinking, the frequency rate of the blinking. Accordingly, one of the decorative functions 114 may include a solid white light function while a second one of the decorative functions 114 may include a white light blinking function. The decorative functions 114 may also include a color light function, a color light blinking function, an alternating light blinking function, a fading function, or other suitable decorative functions. In some examples, the decorative functions 114 may also include motion, audio, or other non-lighting decorative functions. In some implementations, the wireless controller 102 stores instructions and parameters for the various different decorative functions 114 and is configured to directly control the operation of the decoration 112 in accordance with one of the decorative functions 114. In other implementations, the decoration 112 itself is configured to control its own operation (e.g., by a separate decoration controller or circuit) to apply one of the decorative functions 114 in response to an instruction or command signal received from the wireless controller 102.

The decorative device 100 operates in either in a standalone mode or connected mode. In the standalone mode, the wireless controller 102 controls the decoration 112 to apply one or more of the decorative functions 114. In the connected mode, the wireless controller 102 may control, or be controlled by, other devices connected to the wireless controller 102 through an RF mesh network via the mesh transceiver 104. In a connected configuration, the decorative device 100 allows a user to create and control groups of decorative devices that respond as a group to an input received at the interface 110.

The wireless controller 102 connects to and controls other decorative devices via the mesh transceiver 104. In some embodiments, the mesh transceiver 104 is a Bluetooth Low-Energy (BLE) transceiver. The BLE transceiver may establish a mesh network with other BLE transceivers.

In some embodiments, the electronic processor 106 is a microprocessor, a microcontroller, or other suitable processing device. In some embodiments, the memory 108 is one of or a combination of different types of memory, such as read only memory (ROM), random access memory (RAM) (for example, dynamic RAM [DRAM], synchronous DRAM [SDRAM], etc.), electrically erasable programmable read only memory (EEPROM), flash memory, a hard disk, an SD card, or other suitable magnetic, optical, physical, or electronic memory devices or data structures. In some embodiments, the memory 108 stores instructions and parameters for controlling the operation of the decoration 112 according to the various different decorative functions 114 and also stores the network identification of the decorative devices that are paired with the decorative device 100. In some embodiments, the interface 110 is a button, a dial, or other suitable interface for selecting a desired decorative function.

Figure 2:
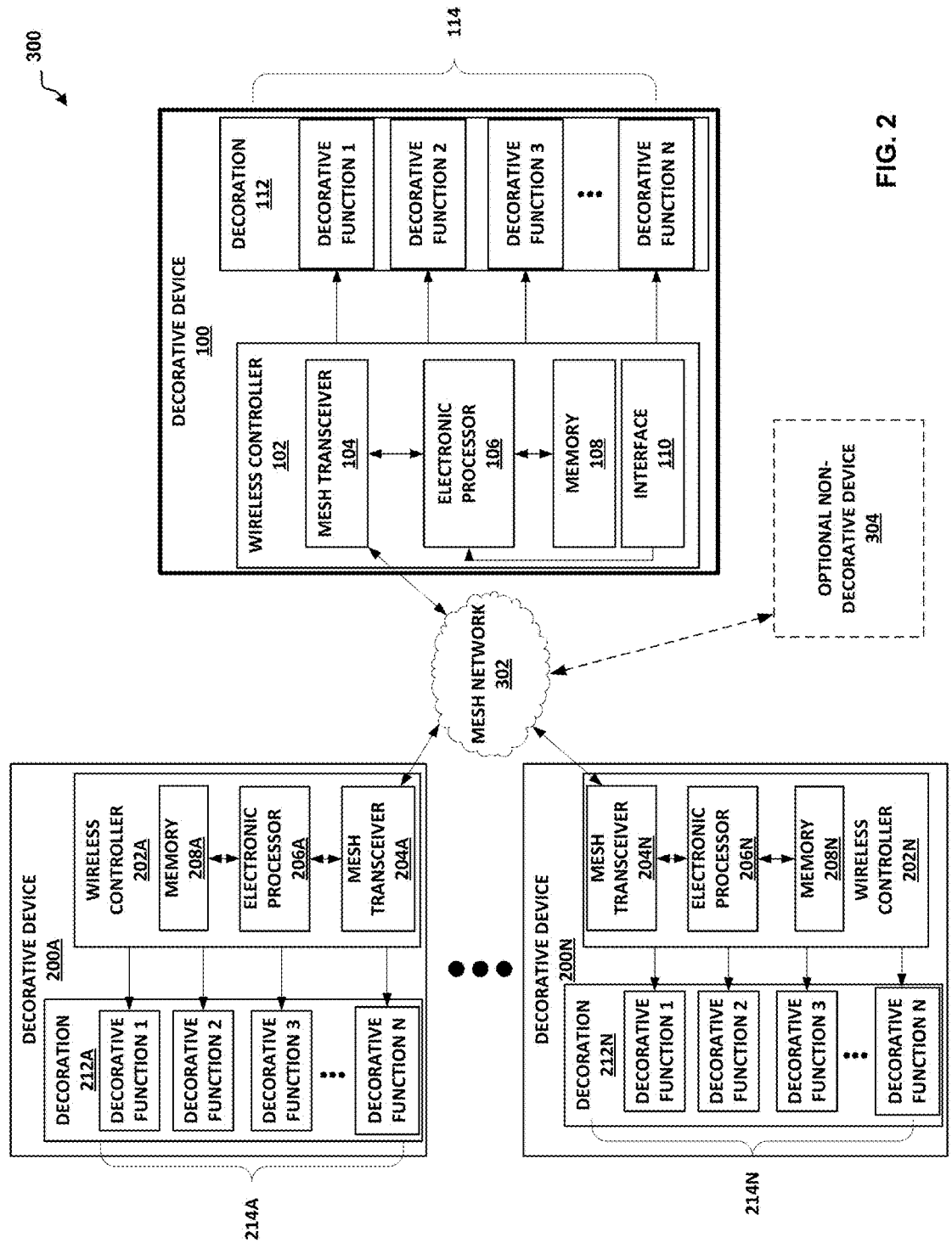
FIG. 2 is a block diagram of a decorative system including the decorative device 100 of FIG. 1 in accordance with some embodiments of the present disclosure.

FIG. 2 is a block diagram of a decorative system 300 including the decorative device 100 of FIG. 1 in accordance with some embodiments of the present disclosure. In addition to the decorative device 100 as described above, FIG. 2 includes a plurality of decorative devices 200A through 200N (collectively "decorative devices 200") and a mesh network 302.

Each decorative device of the decorative devices 200 includes a wireless controller and a decoration having a plurality of decorative functions. In some embodiments, the decoration of each of the decorative devices 200 is a one hundred light string. In other embodiments, some or all of the decorations of the decorative devices 200 are different from each other. Additionally, in some embodiments, although not shown in FIG. 2, some or all of the decorative devices 200 include an interface, e.g., an interface that is the same or similar to the interface 110 of the decorative device 100.

For ease of understanding, the decorative device 200A will be described below. However, the description of the decorative device 200A is applicable to any of the decorative devices 200.

In some embodiments, the wireless controller 202A of decorative device 200A is the same or similar to the wireless controller 102 of the decorative device 100 as described above. For example, the mesh transceiver 204A, the electronic processor 206A, and the memory 208A are the same or similar to the mesh transceiver 104, the electronic processor 106, and the memory 108 of the decorative device 100 as described above.

In some embodiments, the decoration 212A of the decorative device 200A is the same or similar to the decoration 112 as described above. For example, the decoration 212A is a one hundred light string and the decorative functions 214A may include a solid white light function and a white light blinking function. However, the decorative functions 214 may also include a color light function, a color light blinking function, an alternating light blinking function, or other suitable decorative function, for example, a fading function. In other embodiments, the decoration 212A is different than the decoration 112.

Optionally, in some embodiments, the system 300 includes a non-decorative device 304 that is paired with the decorative device 100 and the decorative devices 200 to join the mesh network 302. In this instance, the non-decorative device 304 may function similar to the decorative device 100 by controlling the decorative devices 200 to change between the decorative functions. The non-decorative device 304 may also control the decorations of the decorative devices 100 and 200 to change between their respective decorative functions. In some embodiments, the non-decorative device 304 may be a gateway, server, smartphone, tablet, computer, or other suitable home automation platform. For example, the non-decorative device 304 is a home automation platform or a smartphone that includes BLE capabilities. In other embodiments, the decorative device 200A may receive an IPV6 endpoint command from the cloud via a wired or wireless network and the non-decorative device 304.

In the example of FIG. 2, the decorative device 100 (highlighted by the bold line) controls the decorative devices 200 via the mesh network 302. However, a user may select any of the decorative devices 200 to control the other decorative devices 200 and the decorative device 100 via the mesh network 302. In this instance, the decorative device 100 that is controlled becomes part of the decorative devices 200 and the selected decorative device assumes the controlling role of the previous decorative device 100 in the mesh network 302.

Figure 3A:
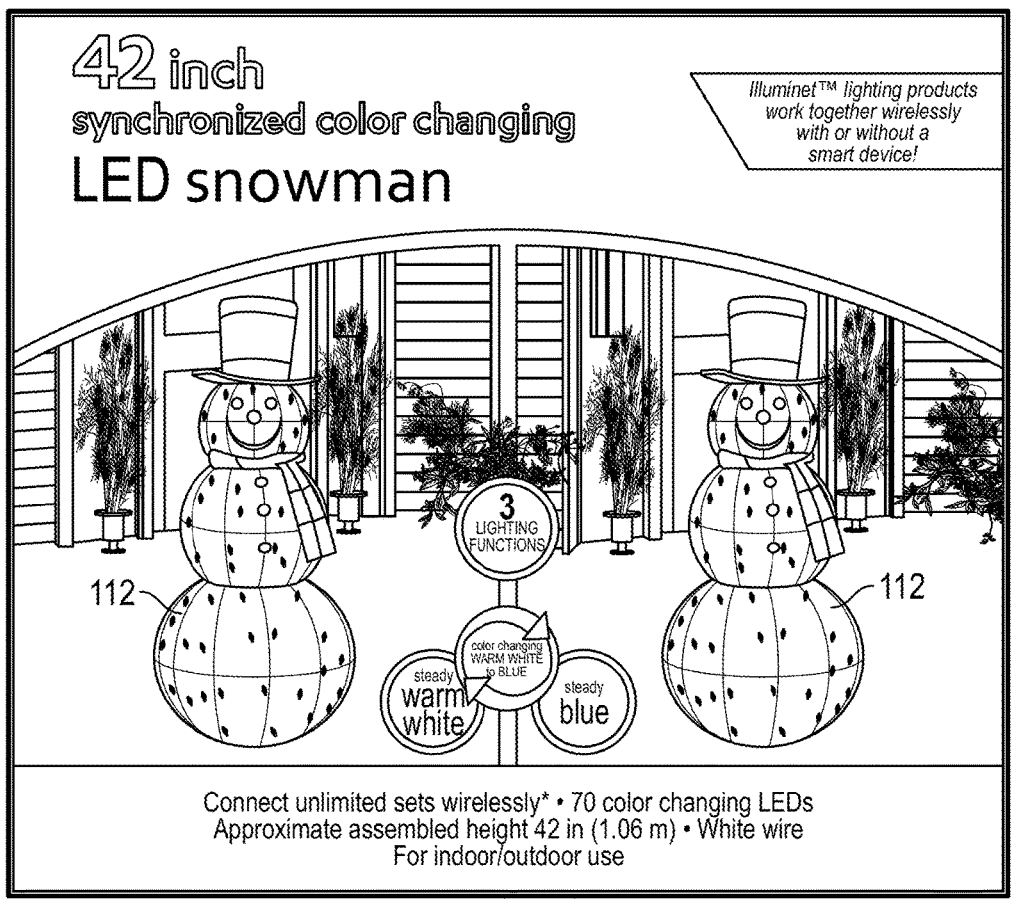
FIGS. 3A through 3C are examples of the decoration of the decorative device of FIG. 1 in accordance with some embodiments of the present disclosure.
Figure 3B:
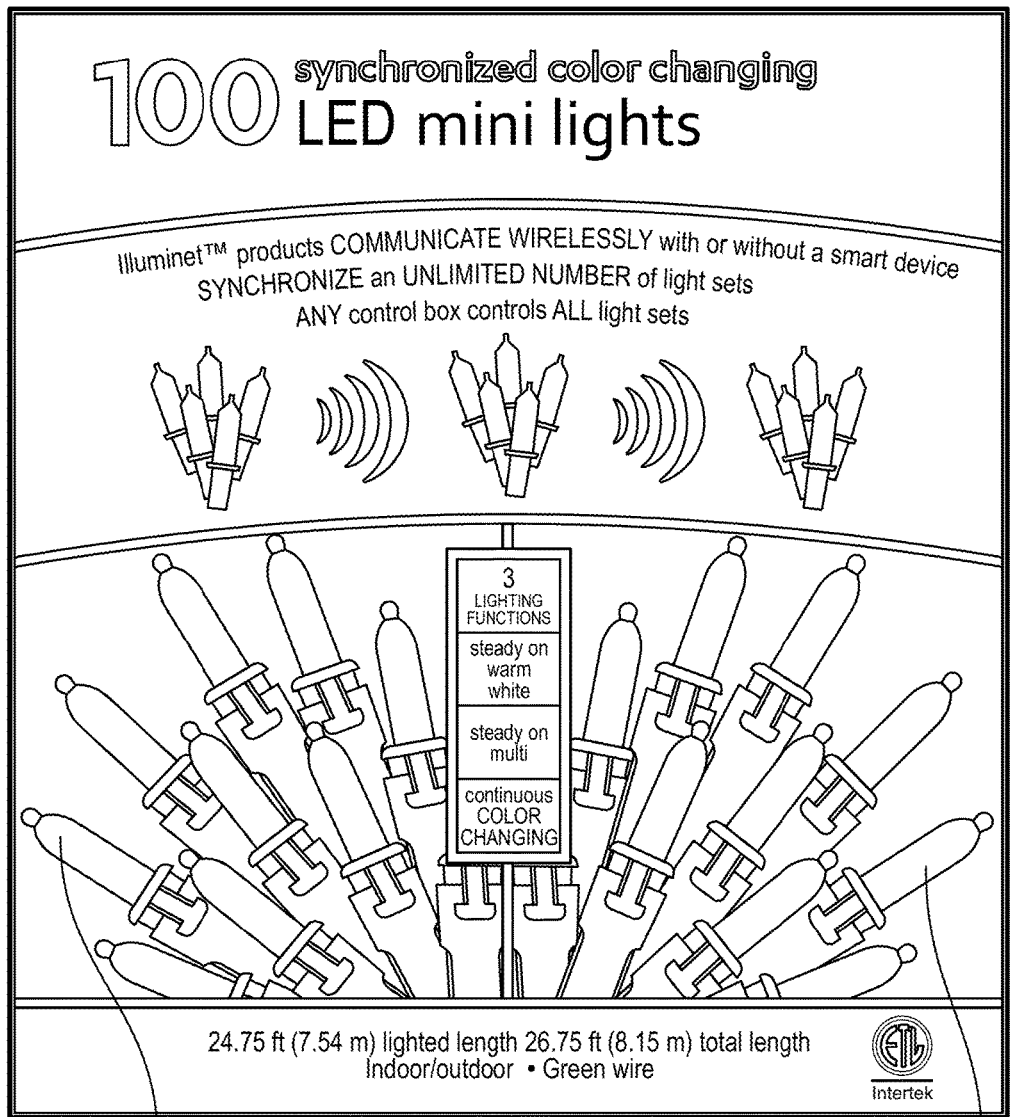
Figure 3C:
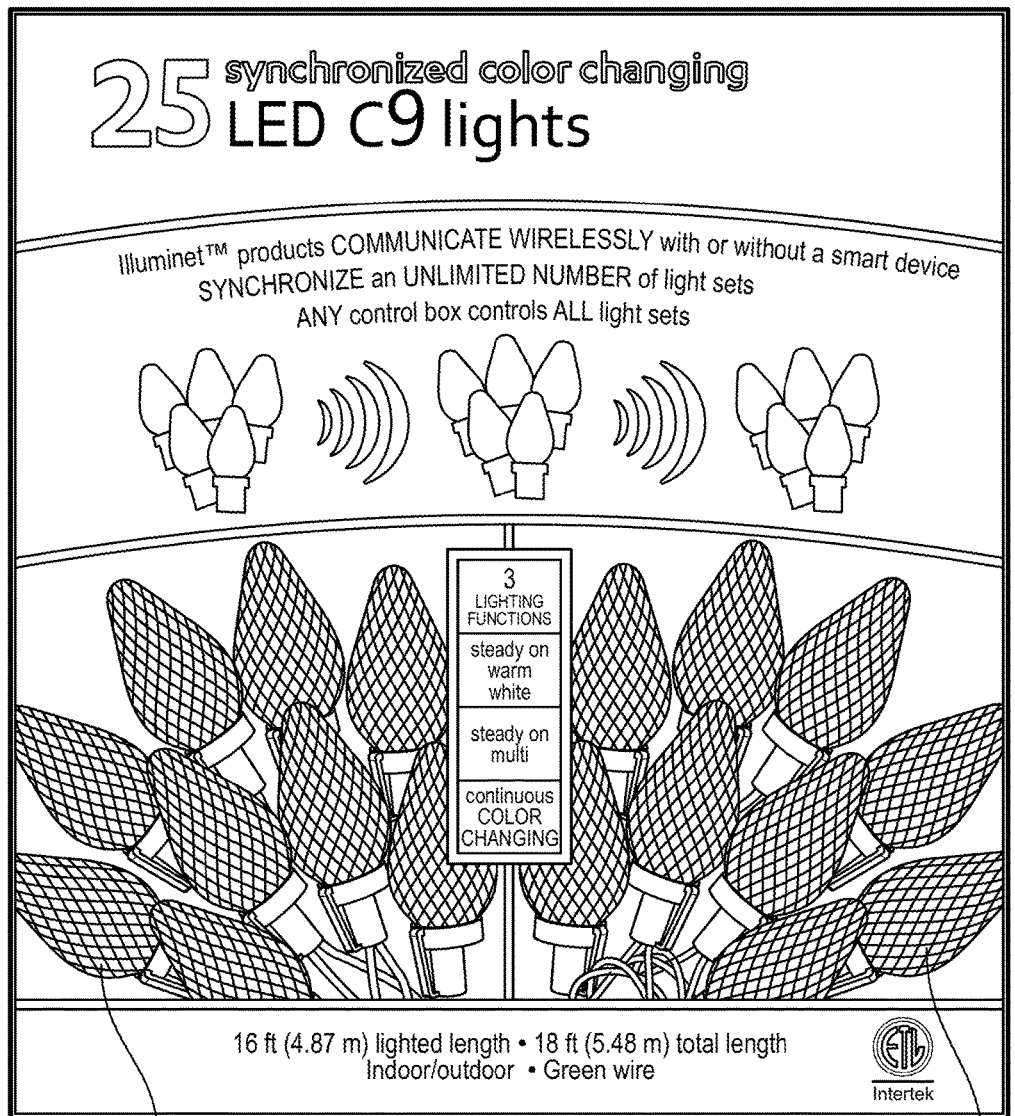

FIGS. 3A through 3C are examples of the decoration 112 of the decorative device 100 of FIG. 1 in accordance with some embodiments of the present disclosure. In the example of FIG. 3A, the decoration 112 is a snowman with a set of LED lights. In the example of FIG. 3B, the decoration 112 is a set of mini LED lights. In the example of FIG. 3C, the decoration 112 is a set of LED C9 lights.

Figure 4:
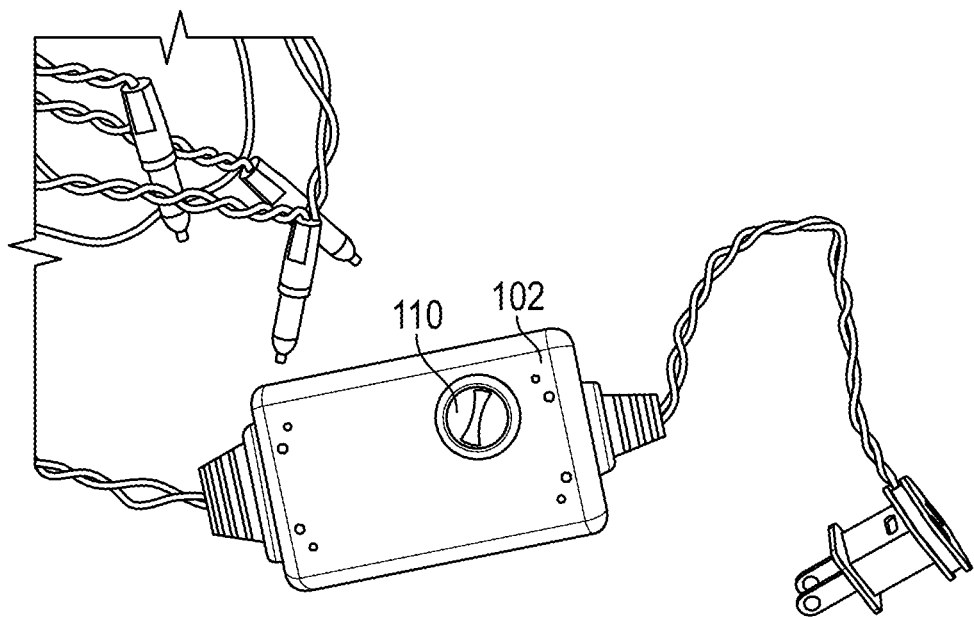
FIG. 4 is one example of a wireless controller with an interface of the decorative device of FIG. 1 in accordance with some embodiments of the present disclosure.

FIG. 4 is an example of the wireless controller 102 with an interface 110 of the decorative device 100 of FIG. 1 in accordance with some embodiments of the present disclosure. In the example of FIG. 4, the wireless controller 102 has a rectangular housing with a dial as the interface 110 and is connected to an outlet plug.

Figure 5:
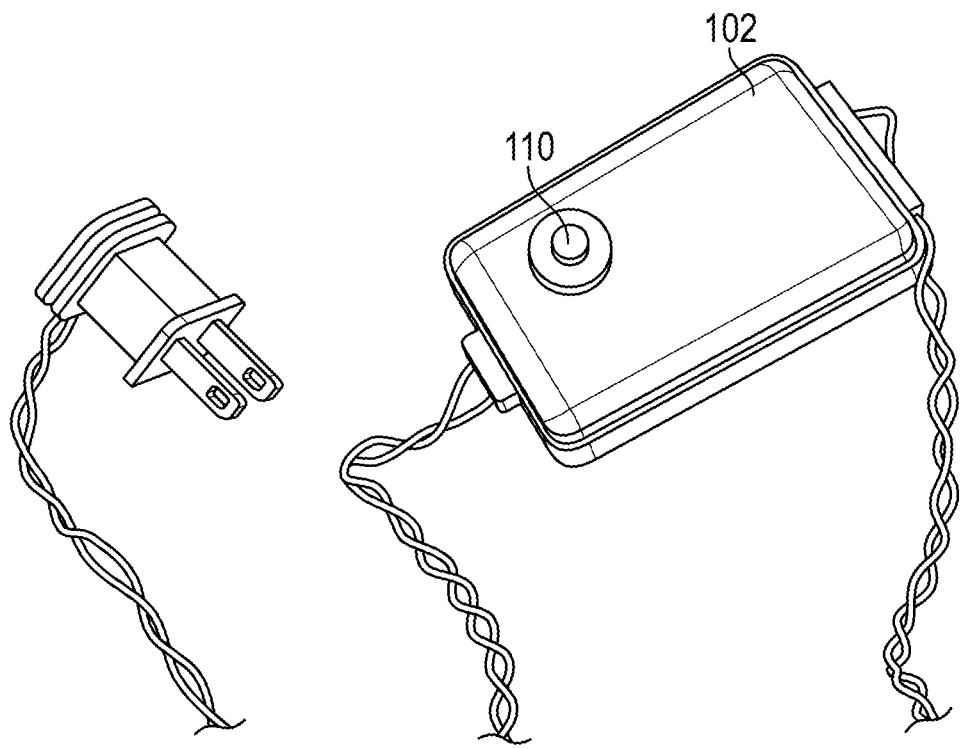
FIG. 5 is another example of a wireless controller with an interface of the decorative device of FIG. 1 in accordance with some embodiments of the present disclosure.

FIG. 5 is another example of the wireless controller 102 with an interface 110 of the decorative device 100 of FIG. 1 in accordance with some embodiments of the present disclosure. In the example of FIG. 5, the wireless controller 102 has a rectangular housing with a push-button as the interface 110 and is connected to an outlet plug.

Figure 6:
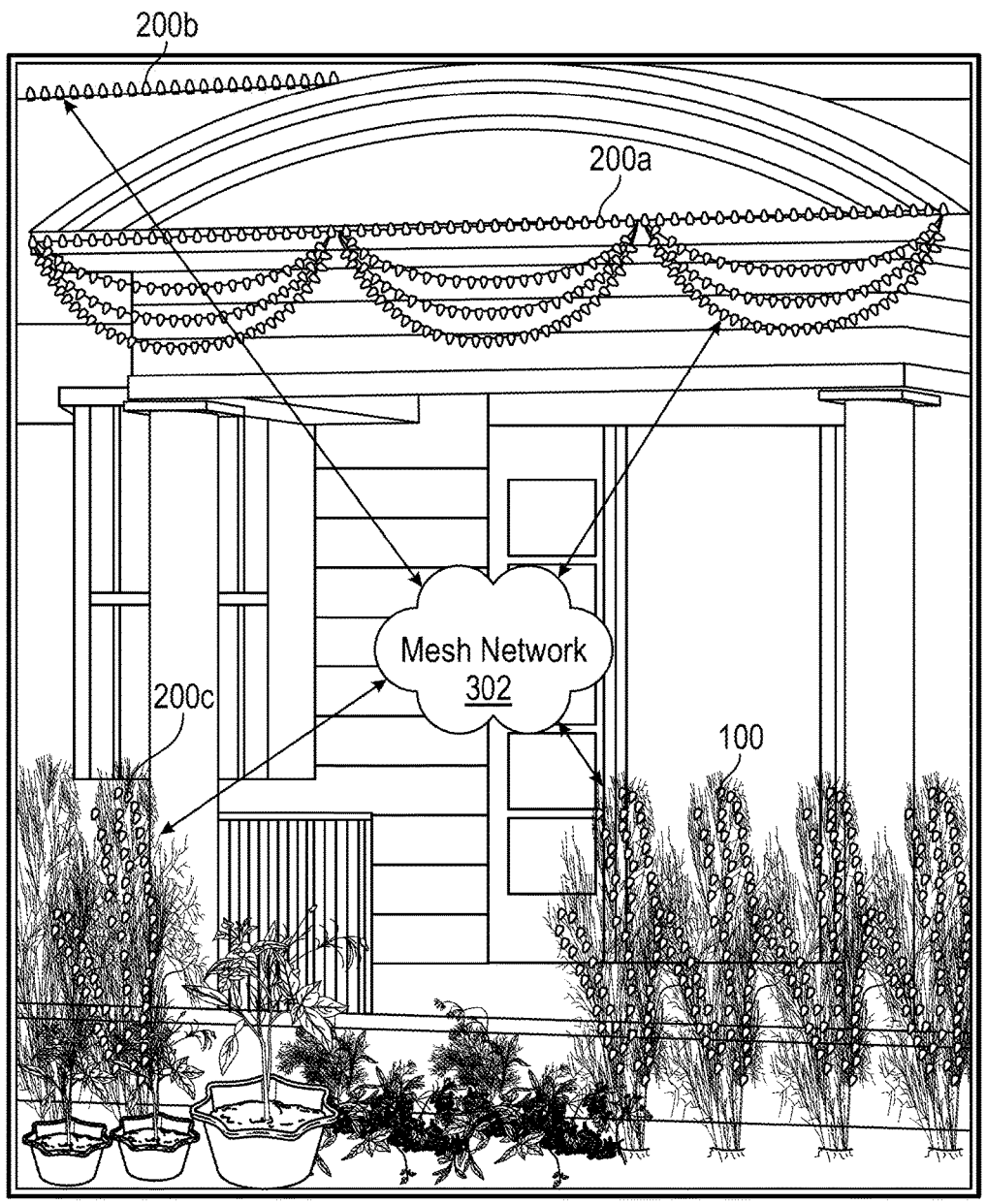
FIG. 6 is an example of the decorative system including the decorative devices of FIG. 2 in an outdoor area in accordance with some embodiments of the present disclosure.

FIG. 6 is an example of the decorative system 300 including the decorative device 100 and the decorative devices 200 of FIG. 2 in an outdoor area in accordance with some embodiments of the present disclosure. In some embodiments, the decorative device 200B may be electrically attached to one end of the decorative device 200A as an extension to form a decorative device 200A and 200B. For example, as illustrated in FIG. 6, the decorative device 200A with a decoration 212A of a first string of white lights may be electrically attached at one end to the decorative device 200B with a decoration 212B of a second string of white lights.

As illustrated in FIG. 2A, the decorative devices 100 and 200A-200C are part of the mesh network 302 and the decorative device 100 is a string of lights over a bush near the door to a house. One particular advantage to the decorative system 300 as illustrated in FIG. 6 is a user's ability to change the decorative function of the decorative device 100 from a first decorative function (e.g., the solid white light function) to a second decorative function (e.g., a blinking white light function), and the decorative device 100 also controls the decorative devices 200A-200C to change their respective decorative functions from a first decorative function (e.g., the solid white light function) to a second decorative function (e.g., a blinking white light function or other designated function). In this way, the user does not need to change the decorative devices by hand and avoids the need to use a ladder to reach decorative devices that are in hard to reach locations.

Another advantage to the decorative system 300 is the user's ability to synchronize the decorative function (e.g., synchronized blinking) across the decorative devices 100 and 200A-200C using a timing signal provided by the decorative device 100 over the mesh network 302. The timing signal provided by the decorative device 100 over the mesh network eliminates the need for the user to time each of the decorative devices by hand. In some examples, the timing signal is a clock signal that is continuously broadcast by the electronic processor 106 of the decorative device 100.

Figure 7:
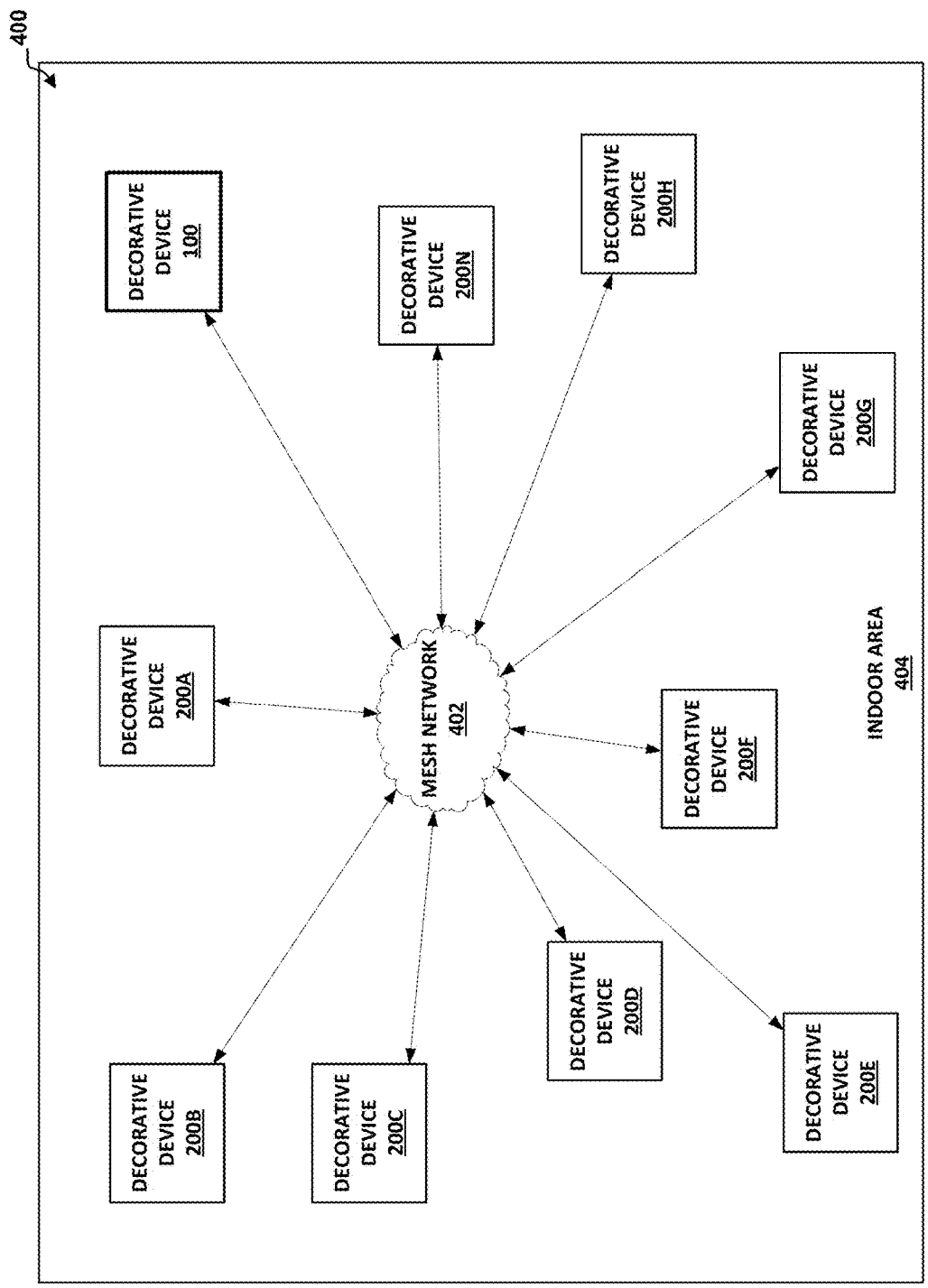
FIG. 7 is a block diagram of the decorative system in an indoor area including the decorative devices of FIG. 2 in accordance with some embodiments of the present disclosure.

FIG. 7 is a block diagram of the decorative system 400 in an indoor area 404 including the decorative device 100 and the decorative devices 200 of FIG. 2 in accordance with some embodiments of the present disclosure. In the example of FIG. 7, the decorative device 100 and the decorative devices 200 form the mesh network 402 within the indoor area 404. The mesh network 402 is similar to the mesh network 302 described above, with the exception that the mesh network 402 does not extend outside of the indoor area 404. In some embodiments, the indoor area 404 is the interior of a house. In other embodiments, the indoor area 404 is the interior of a commercial facility.

Figure 8:
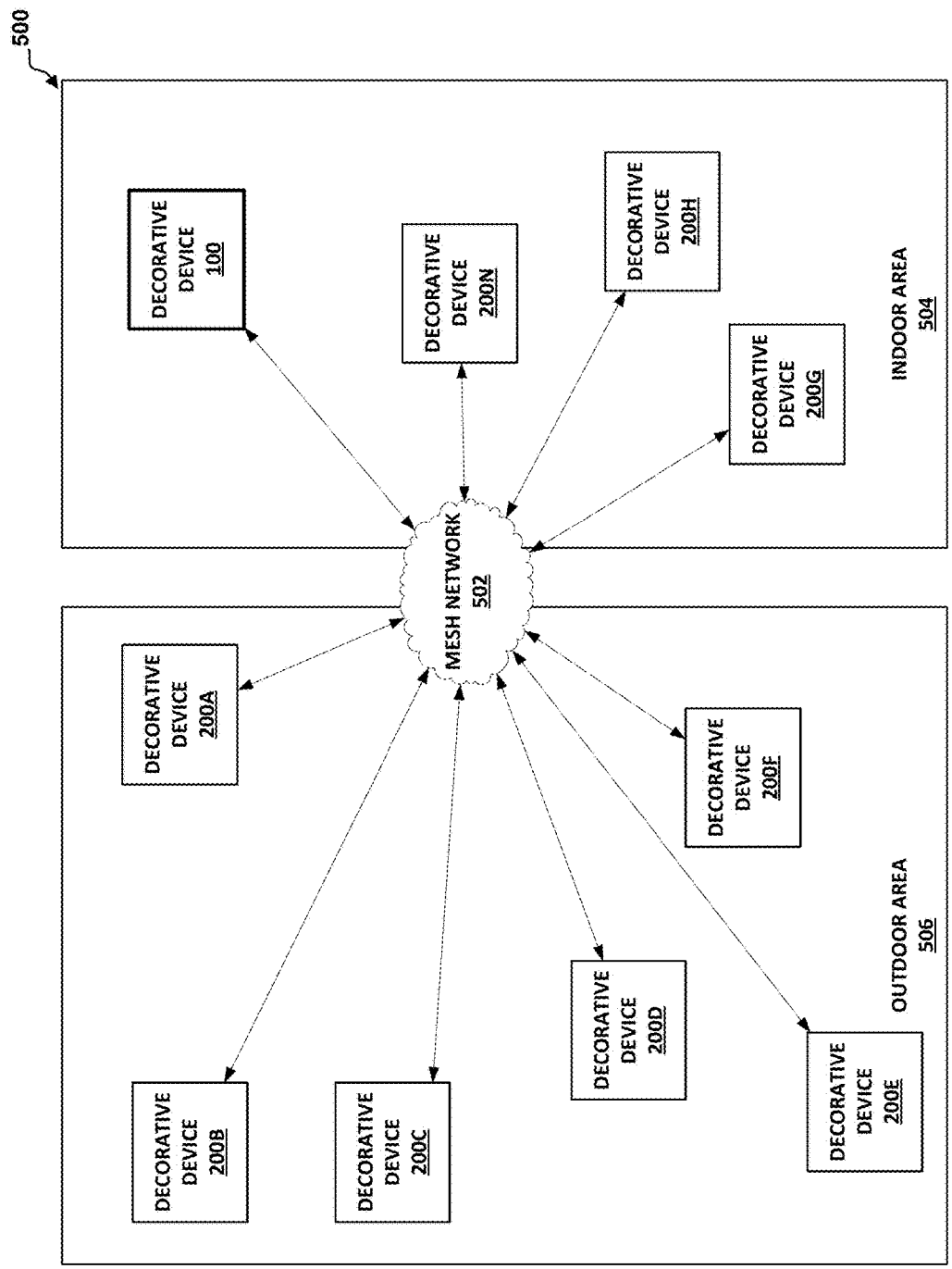
FIG. 8 is a block diagram of the decorative system in an indoor area and an outdoor area including the decorative devices of FIG. 2 in accordance with some embodiments of the present disclosure.

FIG. 8 is a block diagram of the decorative system 500 in an indoor area 504 and an outdoor area 506 including the decorative device 100 and the decorative devices 200 of FIG. 2 in accordance with some embodiments of the present disclosure. In the example of FIG. 8, the decorative device 100 and some of the decorative devices 200 form the mesh network 502 within the indoor area 504 and the remaining decorative devices 200 form the mesh network 502 in the outdoor area 506. The mesh network 502 is similar to the mesh network 402 described above, with the exception that the mesh network 502 is within the indoor area 504 and the outdoor area 506. In some embodiments, the indoor area 504 is the interior of a house or a commercial facility. In some embodiments, the outdoor area 506 is the exterior of the house or the commercial facility. In other embodiments, the outdoor area 506 is the surrounding property of the house or the commercial facility.

Figure 9:
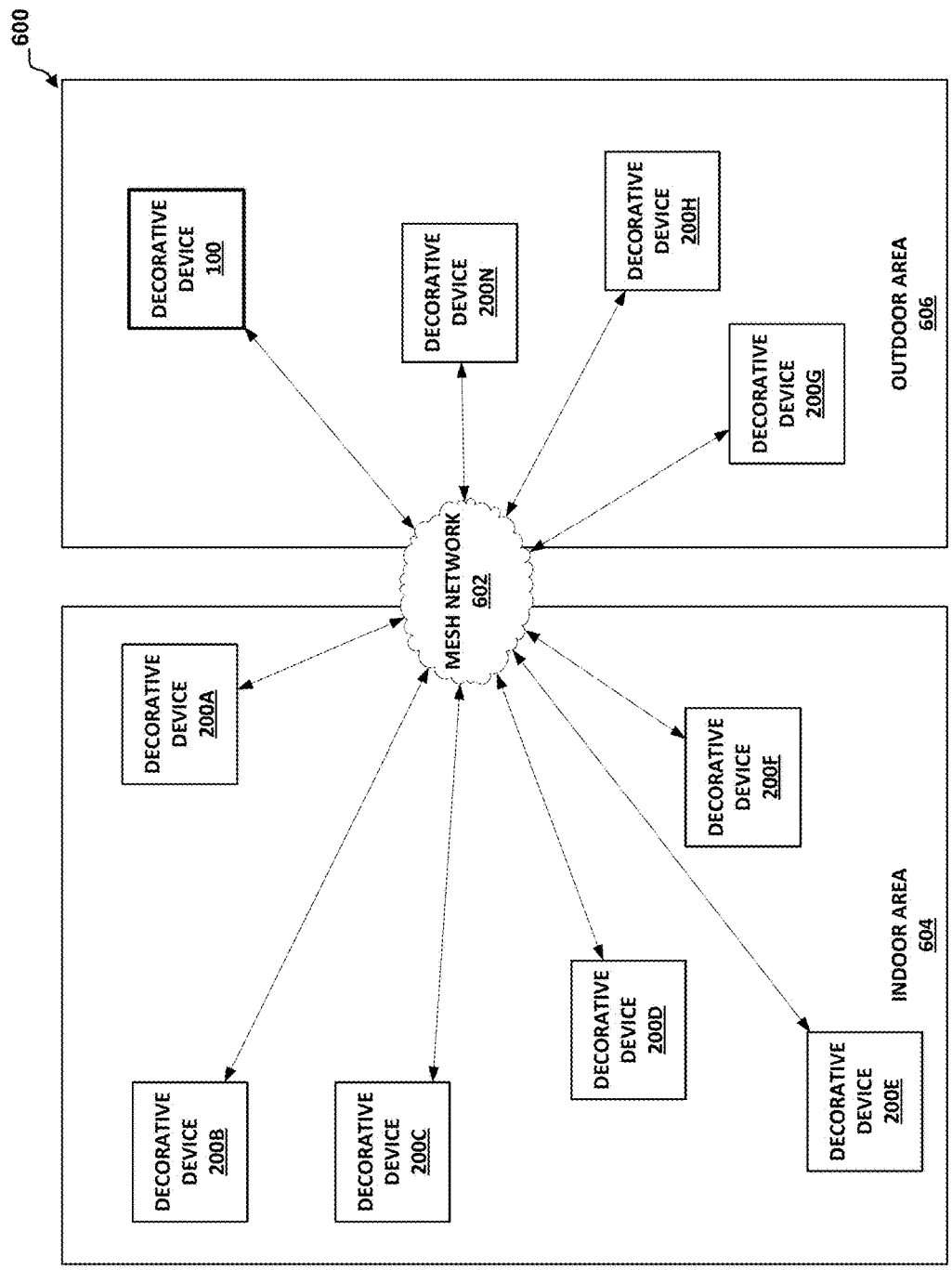
FIG. 9 is a block diagram of the decorative system in an indoor area and an outdoor area including the decorative devices of FIG. 2 in accordance with some embodiments of the present disclosure.

FIG. 9 is a block diagram of the decorative system 600 in an indoor area 604 and an outdoor area 606 including the decorative device 100 and the decorative devices 200 of FIG. 2 in accordance with some embodiments of the present disclosure. In the example of FIG. 9, the decorative system 600 is similar to the decorative system 500 as described above with the exception that the decorative device 100 is located in the outdoor area 606. Accordingly, because the decorative device 100 is equipped with the interface 110 that is used to adjust the decorative function of all of the connected decorative devices 200, the decorative function is controlled/adjusted by a user in an outdoor area 606 in the example of FIG. 9 and is controlled/adjusted by a user in the indoor area 504 in the example of FIG. 8.

Figure 10:
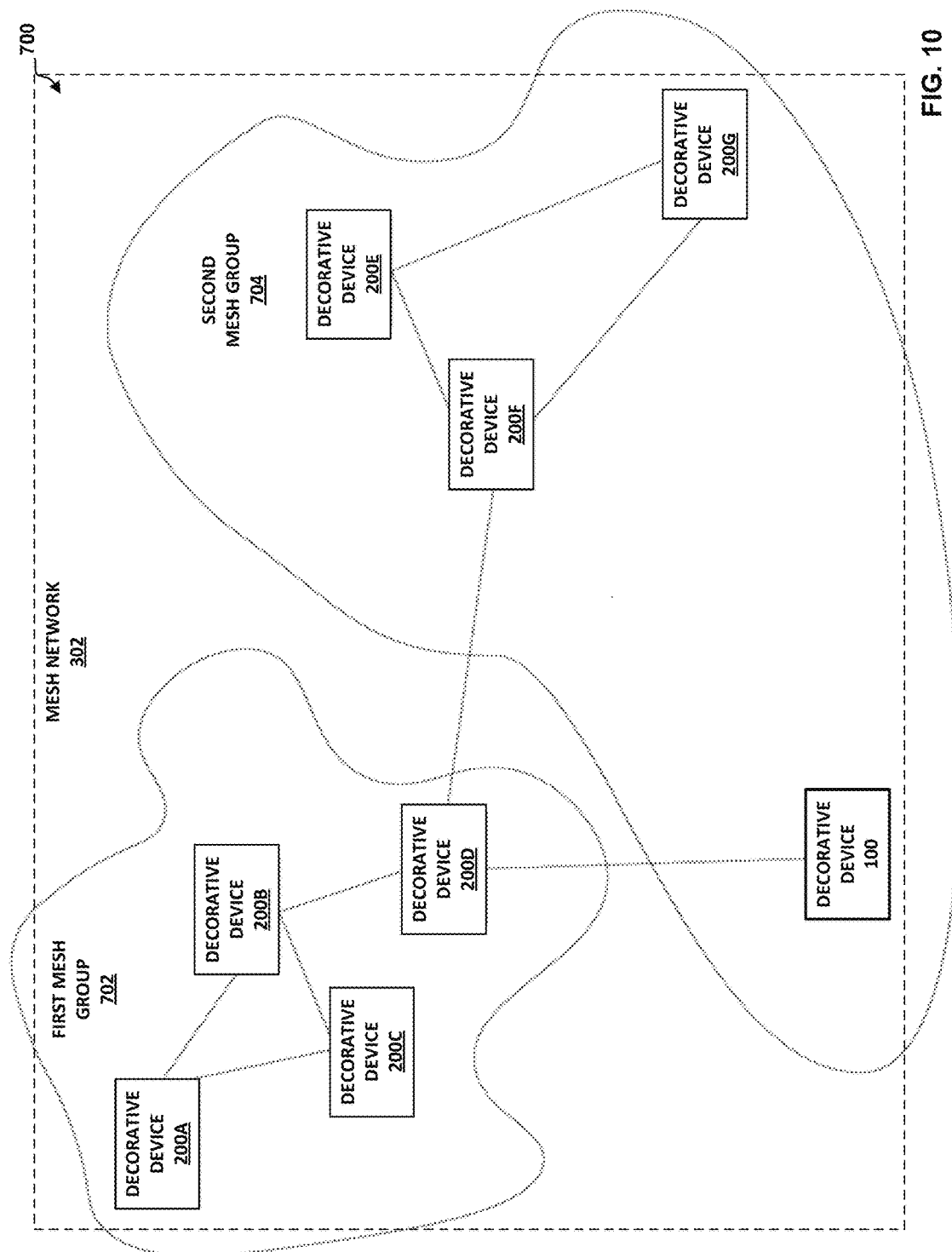
FIG. 10 is a block diagram of the decorative system with two mesh groups in accordance with some embodiments of the present disclosure.

FIG. 10 is a block diagram of the decorative system 700 with the mesh network 302 having a plurality of mesh groups in accordance with some embodiments of the present disclosure. In the example of FIG. 10, the decorative system 700 includes the mesh network 302 having a first mesh group 702 and a second mesh group 704. The first mesh group 702 includes the decorative devices 200A through 200D of the decorative devices 200. The second mesh group 704 includes the decorative device 100 and the decorative devices 200E through 200G of the decorative devices 200.

In the example of FIG. 10, the decorative system 700 is similar to the decorative systems 500 and 600 as described above with the exception that the decorative device 100 is part of the second mesh group 704. Accordingly, because the decorative device 100 is part of the second mesh group 704 and is not part of the first mesh group 702, the broadcast of the decorative function that is controlled/adjusted by a user with the decorative device 100 in the example of FIG. 10 is relayed to the decorative devices 200A through 200D of the first mesh group 702. The decorative devices 200A through 200D do not act on the broadcast from the decorative device 100 because the decorative device 100 is not part of the first mesh group 702. The decorative devices 200A through 200D relay the broadcast from the decorative device 100 to the decorative devices 200E through 200G. The decorative devices 200E through 200G are part of the second mesh group 704 and act on the broadcast from the decorative device 100. In other words, any decorative device can relay any broadcast (i.e., a message, indication, or other suitable broadcast) from any mesh group over the mesh network. However, only decorative devices that are part of the group specified in the broadcast will act on the broadcast.

Although some of the drawings of the examples discussed above illustrate the decorative devices coupled to a "mesh network," those skilled in the art will understand that, in a non-mesh network configuration, there is not necessarily a central "hub" to the wireless network and instead all of the devices in the mesh network are configured to help relay communications between other devices in the network. One example of interconnections between devices in a "mesh" network is illustrated in FIG. 10.

In the example of FIG. 10, the decorative device 100 is configured to control the decorative devices 200E through 200G of the second mesh group 704 and, in some embodiments, one of the decorative devices 200A through 200D is configured to operate as a second decorative device 100 that controls the decorative devices in the first mesh group 702. However, in other embodiments or situations, the decorative device 100 may be reconfigured from operating as part of the second mesh group 704 to operating as a part of the first mesh group 702. The decorative device 100 may also be configured to automatically detect conditions that cause the decorative device 100 to switch from the second mesh group 704 to the first mesh group 702—for example, if the decorative device 100 is positioned out of range of the other decorative devices of the second mesh group 704 and/or is otherwise unable to communicate wirelessly with the other decorative devices in the second mesh group 704. In yet other embodiments, a second decorative device 100 (not pictured) may be added to the first mesh group 702 and configured to control the operation of the other decorative devices in the first mesh group 702.

Figure 11:
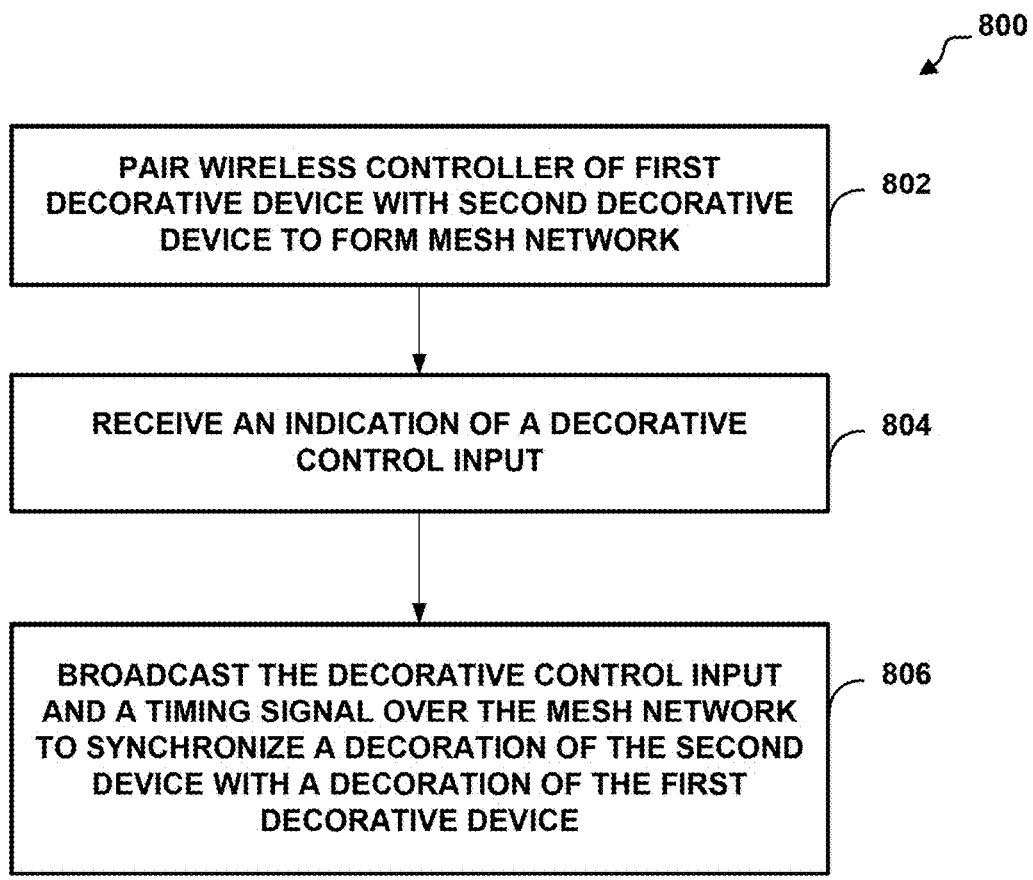
FIG. 11 is a flowchart of a method for operating a decorative system.

FIG. 11 is a flowchart of a method 800 for operating the decorative system 300 of FIG. 3. The method 800 is described with respect to the decorative system 300 of FIG. 2. However, the method 800 is also applicable to the decorative systems 400, 500, and 600 of FIGS. 7-10.

In the example of FIG. 11, the method 800 includes pairing the wireless controller 102 of the decorative device 100 with the decorative device 200A to form the mesh network 302 (e.g., grouping of decorative devices) (block 802). For example, upon receiving a pairing input from a user at the interfaces of the decorative devices 200A and the decorative device 100, the aforementioned interfaces provide a pairing indication to the electronic processors 206A and 106, respectively. The electronic processors 206A and 106 control the mesh transceivers 204A and 104 to form the mesh network 302 in response to the pairing input. Another decorative device, for example, the decorative device 204N may join the mesh network 302 in response to receiving a pairing input from the user at an interface of the decorative device 204N in a similar manner as described above.

In other embodiments, the decorative device 200A and the decorative device 100 pair with each other when a user turns on the decorative device 200A and the decorative device 100. For example, upon receiving a power input from a user (e.g., switched on or plugged in), the electronic processors 206A and 106 control the mesh transceivers 204A and 104 to form the mesh network 302. Another decorative device, for example, the decorative device 204N may join the mesh network 302 in response to receiving a power input from a user at an interface of the decorative device 204N in a similar manner as described above.

In the example of FIG. 11, after forming the mesh network 302, the method 800 includes receiving an indication of a decorative control input to change between the decorative functions 100 (block 804). In some examples, the indication of the decorative control input may be received at the interface 110 of the decorative device 100. In other examples, the indication of the decorative control input may be received by the electronic processor 106 from a non-decorative device (e.g., a smartphone, a tablet, a personal computer, or other suitable non-decorative device).

In response to receiving the indication of the decorative control input, the method 800 also includes broadcasting the decorative control input and a timing signal over the mesh network 302 to synchronize the decoration 212A of the decorative device 200A (and any other decorative devices that are part of the mesh network 302) with the decoration 112 of the decorative device 100 (block 806).

In some embodiments, in response to receiving the indication of the decorative control input, the electronic processor 106 changes the decorative functions 114 of the decoration 112 based on the indication of the decorative control input. Additionally or alternatively, in some embodiments the wireless controller 102 also broadcasts the decorative control input with the mesh transceiver 104 over the mesh network 302 to control the decorative functions of each of the decorative devices connected to the mesh network 302 (e.g., the decorative devices 200). For example, the wireless controller 102 broadcasts the decorative control input with the mesh transceiver 104 to control the decoration 212A of the decorative device 200A to change from a third decorative function to a fourth decorative function.

To summarize, the decorative devices (e.g., the decorative devices 100 and 200) when connecting to the mesh network 302 assume the same designated function (e.g., synchronize functions with each other). The designated function may be the same or different between the decorative devices. For example, the decorative devices may synchronize with the blinking white light function. However, in a different example, the decorative devices may synchronize with blinking lights, and some of the decorative devices may be operating in a blinking white light function and the other decorative devices may be operating in a blinking color light function. In yet another example, some of the decorative devices may be operating in a silent and motionless blinking white light function and be synchronized with the other decorative devices that may be operating in a blinking color light function with audio and/or motion. In other examples, less than all of the decorations of the decorative devices may be synchronized together.

The synchronization described within the present disclosure is not limited to the above described combinations for a single residence. For example, two or more neighbors may synchronize their decorative devices together to form a neighborhood mesh network. The neighborhood mesh network may be controlled by a decorative device to synchronize all of the decorative devices associated with the neighborhood mesh network.

The following represent examples of use cases for the decorative systems 300-700.

Scenario 1:

Single short press changes color mode and if any light is advertising the light adds to advertising group Holding the button for >15 sec (Until two flash) put in Add light mode
  (If no one advertising, if someone is advertising connects to the group)
  Lights slowly pulsate
  Advertises stored group ID
  Returns to normal operation after 1 minutes
  Hitting the button again returns light to operating (in assigned group and color)

Holding the button for >30 seconds (Until 3 flash) resets the string, creates new group
  Lights flash 3 times
  Light stays in current color mode
  Light creates a new random group ID New out of box:
  The light defaults to normal operation. (Its group ID is null, and doesn't get set until the user hits the button until the light blinks 3 times)
  String A blink quickly and generates a random net id
  String A returns to normal mode, but with a group id
  User depresses button until lights blink on and off
  String A blinks on and off (ramping on and off) indicating pairing mode
  String A will stay in pairing mode for 1 minute (In case you have run around the house)
  String A advertises its Group ID
  Hit the button on string B until the lights blink once
  String B stores the Group ID
  String B blinks once and sets itself to string A's mode
  String B looks like string A
  If the user changes any light color on A or B, all the other string on the same group ID change color Adding a light to an existing network
  Go to any string and hit the button until the light blinks on and off
  String A blinks on and off (ramping on and off) indicating pairing mode
  String A will stay in pairing mode for 1 minute (In case you have run around the house)
  String A advertises its group ID
  Depress the button until the light blinks once on the string B to add to the group
  String B stores the net ID
  String B blinks once
  String B looks like string A
  If the user changes any light color on any string in the group, all the other strings on the same net ID change color
  If the user hits the button twice on any other string while A is advertising, that string will get configures to the net id of string A, and look like A and its group
  Messages will route through any other associated device, independent of the target mesh id.

Disconnect a light from any network:
  To disconnect a string from any network, depress the button until the light blinks 3 times, the light blinks 3 times and goes to normal operation, the light will generate a new random group ID, allowing any light to pair to its newly created group, the string will then move to the Advertise state, allow lights to be added, timeout in 1 minute, or go to normal single string operation if the button is depressed.

In some implementations, a random network id is used, because at any time a master could be removed from a network, if that master becomes another master, it would then be associated with another string. During the association or pairing operation, messages should be forwarded through other nodes, this allows associations outside the distance to the "master".

Figure 12:
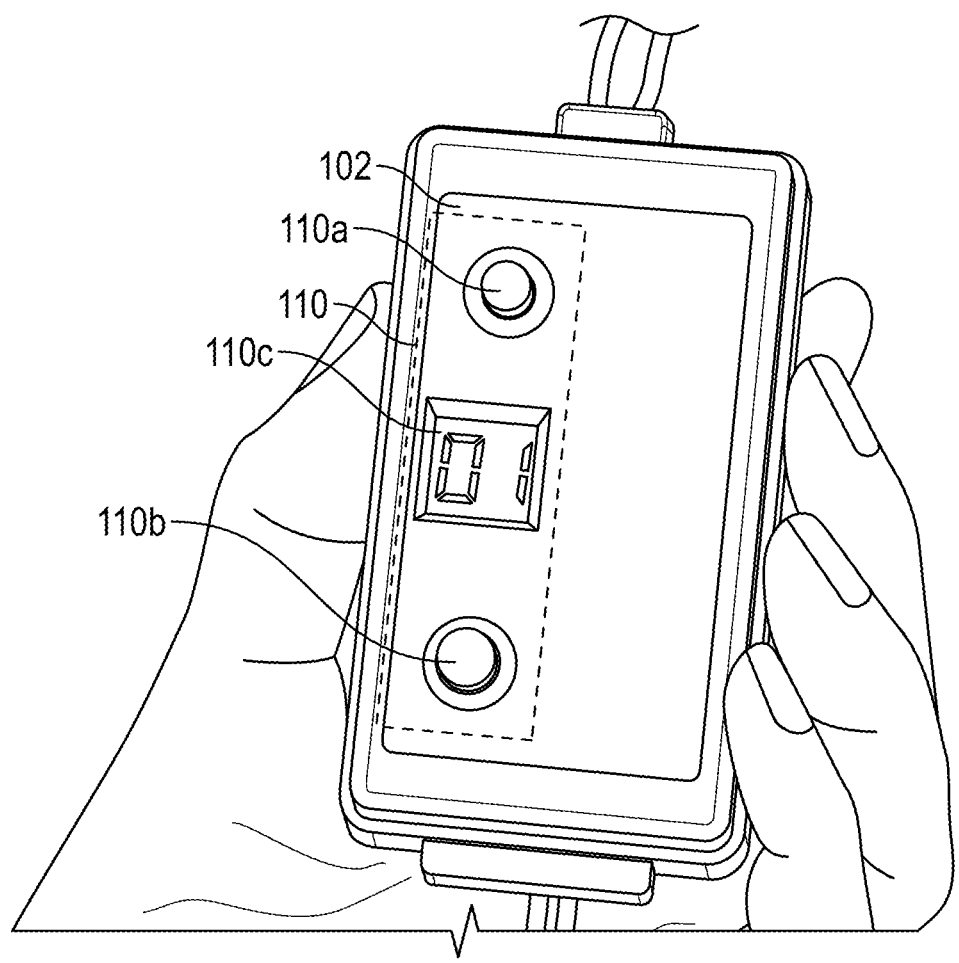
FIG. 12 is another example of a wireless controller with an interface of the decorative device of FIG. 1 in accordance with some embodiments of the present disclosure.

FIG. 12 is another example of wireless controller 102 with an interface 110 of the decorative device 100 of FIG. 1 in accordance with some embodiments of the present disclosure. In the example of FIG. 12, the wireless controller 102 has a rectangular housing with two push-buttons 110A and 110B along with display 110C as the interface 110 and is connected to an outlet plug (not shown). The push-button 110A provides an indication of a decorative control input to the electronic processor 106. The push-button 110B provides a control signal to the electronic processor 106 to change a communication channel of the mesh transceiver 104. The display 110C provides information to a user regarding a current communication channel of the mesh transceiver 104. For example, as illustrated in FIG. 12, the current communication channel of the mesh transceiver 104 is 1, which may be changed with the push-button 110B.

Figure 13:
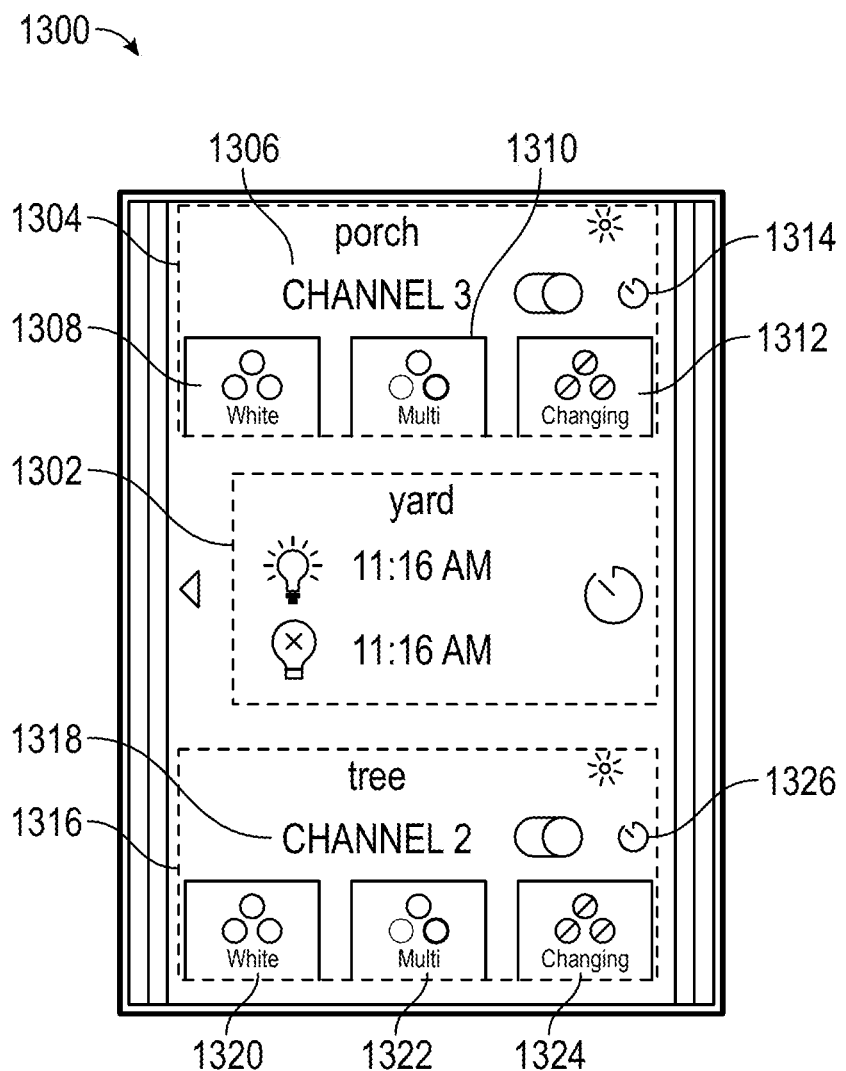
FIG. 13 is an example of a graphical user interface for a control application on a non-decorative device in the decorative system of FIG. 2 in accordance with some embodiments of the present disclosure.

FIG. 13 is an example of a graphical user interface 1300 for a control application on a non-decorative device 302 in the decorative system 300 of FIG. 2 in accordance with some embodiments of the present disclosure. In the example of FIG. 13, the graphical user interface 1300 includes a timer section 1302 for the decorative device named "yard." The timer section 1302 translates the time displayed into a timer on/off input and transmits the timer on/off input to the current "master" decorative device via the mesh network 302. The current "master" device, for example, the decorative device 100, stores the timer on/off input in the memory 108. The decorative device 100 broadcasts a decorative control input via the mesh network to control the decorative devices associated with the mesh network 302 to turn "on" or "off" their respective decorations at the time set forth in the timer on/off input.

In the example of FIG. 13, the graphical user interface 1300 also includes two other decorative device sections 1304 and 1316 named "porch" and "tree," respectively. As illustrated in FIG. 13, the decorative device section 1304 has a communication channel section 1306, three decorative functions 1308-1312 (i.e., a white steady light decorative function, multi-colored steady light decorative function, and changing light decorative function), and a timer section 1314. The decorative device section 1304 is currently set to the multi-colored steady light decorative function 1308 and the communication channel section 1306 displays a communication channel "3."

Additionally, as illustrated in FIG. 13, the decorative device section 1316 has a communication channel section 1318, three decorative functions 1320-1324 (i.e., a white steady light decorative function, multi-colored steady light decorative function, and changing light decorative function), and a timer section 1326. The decorative device section 1316 is currently set to the multi-colored steady light decorative function 1322 and the communication channel section 1318 displays a communication channel "2." The difference between the communication channel section 1306 and the communication channel section 1318 indicates that the decorative device associated with the decorative device section 1316 is in a different "group" than the decorative device associated with the decorative device section 1304.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A decorative device comprising:
   a decoration having a plurality of decorative functions; and
   a wireless controller including
      a memory,
      a user interface configured to
         generate a pairing input, and
         generate a decorative control input,
      a mesh transceiver configured to form a mesh network with a plurality of mesh transceivers, and
      an electronic processor connected to the memory, the user interface, and the mesh transceiver, the electronic processor configured to
         receive the pairing input,
         in response to receiving the pairing input, control the mesh transceiver to form the mesh network with one or more mesh transceivers of the plurality of mesh transceivers,
         receive the decorative control input,
         in response to receiving the decorative control input, control the decoration to display a first decorative function of the plurality of decorative functions, and
         in response to receiving the decorative control input, control the mesh transceiver to broadcast the decorative control input and a timing signal over the mesh network to synchronize one or more decorations of one or more decorative devices with the decoration, each of the one or more decorative devices including at least one of the one or more mesh transceivers,
   wherein the decorative device is not physically connected to the one or more decorative devices.

2. The decorative device of claim 1, wherein the electronic processor is further configured to
   receive a second decorative control input and a second timing signal from one of the one or more decorative devices over the mesh network via the mesh transceiver, and
   in response to receiving the second decorative control input, control the decoration to change to a second decorative function of the plurality of decorative functions from the first decorative function of the plurality of decorative functions.

3. The decorative device of claim 2, wherein the electronic processor is further configured to
   in response to receiving the second decorative control input and the second timing signal, control the mesh transceiver to broadcast the second decorative control input and the second timing signal over the mesh network to synchronize the one or more decorations of one or more decorative devices with the decoration.

4. The decorative device of claim 1, wherein the mesh transceiver is a Bluetooth low energy (BLE) mesh transceiver.

5. The decorative device of claim 1, wherein the plurality of decorative functions includes two or more functions selected from a group consisting of:
   a color light function,
   a color light blinking function,
   an alternating light blinking function, and
   a fading function.

6. The decorative device of claim 1, wherein the plurality of decorative functions includes at least one of a motion function or an audio function.

7. The decorative device of claim 1, wherein the electronic processor is further configured to
   receive a second decorative control input from a non-decorative device via the mesh transceiver and the mesh network, and
   in response to receiving the second decorative control input, control the decoration to change to a second decorative function of the plurality of decorative functions from the first decorative function of the plurality of decorative functions.

8. The decorative device of claim 1, wherein the electronic processor is configured to control the mesh transceiver to continuously broadcast the timing signal over the mesh network.

9. The decorative device of claim 1, further comprising:
   a plurality of decorations including the decoration, each decoration of the plurality of decorations having a respective plurality of decorative functions, and
   in response to receiving the decorative control input, the electronic processor is further configured to control the mesh transceiver to broadcast the decorative control input and the timing signal over the mesh network to synchronize the one or more decorations of the one or more decorative devices with the plurality of decorations.

10. A decorative system comprising:
    a first decorative device including
       a first decoration having a first plurality of decorative functions, and
       a first wireless controller having a first mesh transceiver; and
    a second decorative device including
       a second decoration having a second plurality of decorative functions, and
       a second wireless controller including
          a memory,
          a user interface configured to
             generate a pairing input, and
             generate a decorative control input,
          a second mesh transceiver configured to form a mesh network with at least the first mesh transceiver, and
          an electronic processor connected to the memory, the user interface, and the second mesh transceiver, the electronic processor configured to
             receive the pairing input from the user interface,
             in response to receiving the pairing input, control the second mesh transceiver to form the mesh network with at least the first mesh transceiver,
             receive the decorative control input from the user interface,
             in response to receiving the decorative control input, control the second decoration to display a first decorative function of the second plurality of decorative functions, and
             in response to receiving the decorative control input, control the second mesh transceiver to broadcast the decorative control input and a timing signal over the mesh network to synchronize at least the first decoration of the first decorative device with the second decoration,
wherein the first decorative device is not physically connected to the second decorative device.

11. The decorative system of claim 10, wherein the electronic processor is further configured to
receive a second decorative control input and a second timing signal from the first decorative device over the mesh network via the second mesh transceiver, and
in response to receiving the second decorative control input, control the second decoration to change to a second decorative function of the second plurality of decorative functions from the first decorative function of the second plurality of decorative functions.

12. The decorative system of claim 10, wherein the first mesh transceiver and the second mesh transceiver are each a Bluetooth Low Energy (BLE) mesh transceiver.

13. The decorative system of claim 10, wherein the first plurality of decorative functions includes two or more functions selected from a group consisting of:
a color light function,
a color light blinking function,
an alternating light blinking function,
a fading function,
a motion function, and
an audio function.

14. The decorative system of claim 13, wherein the second plurality of decorative functions includes two or more functions selected from a second group consisting of:
a color light function,
a color light blinking function,
an alternating light blinking function,
a fading function,
a motion function, and
an audio function.

15. The decorative system of claim 10, wherein the electronic processor is further configured to
receive a second decorative control input from a non-decorative device via the second mesh transceiver and the mesh network, and
in response to receiving the second decorative control input, control the second decoration to change to a second decorative function of the second plurality of decorative functions from the first decorative function of the second plurality of decorative functions.

16. The decorative system of claim 15, wherein the second decorative control input from the non-decorative device is generated by a control application on the non-decorative device, and wherein the second decorative control input is based on a specific time set by a user.

17. The decorative system of claim 15, wherein the electronic processor is further configured to
in response to receiving the second decorative control input, control the second mesh transceiver to broadcast the second decorative control input over the mesh network to control the first decoration to change to a second decorative function of the first plurality of decorative functions from a first decorative function of the first plurality of decorative functions.

18. The decorative system of claim 10, wherein the electronic processor is configured to control the second mesh transceiver to continuously broadcast the timing signal over the mesh network.

19. The decorative system of claim 10, wherein the second decorative device further includes a plurality of decorations including the second decoration, each decoration of the plurality of decorations having a respective plurality of decorative functions, and
in response to receiving the decorative control input, the electronic processor is further configured to control the second mesh transceiver to broadcast the decorative control input and the timing signal over the mesh network to synchronize at least the first decoration of the first decorative device with the plurality of decorations.

20. A method for operating a decorative system, the method comprising:
receiving, with an electronic processor of a first decorative device, a pairing input that is generated by a user interface of the first decorative device;
pairing, with the electronic processor, a mesh transceiver of the first decorative device with a mesh transceiver of a second decorative device to form a mesh network in response to receiving the pairing input;
receiving, with the electronic processor, a decorative control input that is generated by the user interface;
controlling, with the electronic processor, the decoration of the first decorative device to display a first decorative function of a first plurality of decorative functions based on the decorative control input; and
controlling, with the electronic processor, the mesh transceiver of the first decorative device to broadcast the decorative control input and a timing signal over the mesh network to synchronize a decoration of the second decorative device with the decoration of the first decorative device in response to receiving the decorative control input,
wherein the decoration of the second decorative device has a second plurality of decorative functions, and
wherein the first decorative device is not physically connected to the second decorative device.

21. The method of claim 20, further comprising:
receiving, with the electronic processor, a second decorative control input and a second timing signal from the second decorative device over the mesh network via the mesh transceiver of the first decorative device; and
controlling, with the electronic processor, the decoration of the first decorative device to change to a second decorative function from the first decorative function in response to receiving the second decorative control input.

22. The method of claim 20, further comprising:
receiving, with the electronic processor, a second decorative control input from a non-decorative device via the mesh transceiver of the first decorative device and the mesh network; and
in response to receiving the second decorative control input, control the decoration of the first decorative device to change to a second decorative function of the first plurality of decorative functions from the first decorative function of the first plurality of decorative functions.

23. The method of claim 22, further comprising:
in response to receiving the second decorative control input, controlling, with the electronic processor, the mesh transceiver of the first decorative device to broadcast the second decorative control input over the mesh network to control the decoration of the second decorative device to change to a second decorative function of the second plurality of decorative functions from a first decorative function of the second plurality of decorative functions.

24. The method of claim 20, wherein the mesh network is a Bluetooth Low Energy (BLE) mesh network.

25. The method of claim 20, wherein the first plurality of decorative functions includes two or more functions selected from a group consisting of:
- a color light function,
- a color light blinking function,
- an alternating light blinking function,
- a fading function,
- a motion function, and
- an audio function.

* * * * *